US007636709B1

(12) United States Patent
Srikant et al.

(10) Patent No.: US 7,636,709 B1
(45) Date of Patent: Dec. 22, 2009

(54) METHODS AND SYSTEMS FOR LOCATING RELATED REPORTS

(75) Inventors: Sreedhar Srikant, Marietta, GA (US); Karen A. Papierniak, Fenton, MI (US); Paul Cereghini, Escondido, CA (US)

(73) Assignee: Teradata US, Inc., Miamisburg, OH (US)

( * ) Notice: Subject to any disclaimer, the term of this patent is extended or adjusted under 35 U.S.C. 154(b) by 489 days.

(21) Appl. No.: 10/264,130

(22) Filed: Oct. 3, 2002

(51) Int. Cl.
*G06F 17/30* (2006.01)

(52) U.S. Cl. .................... 707/3; 707/4; 707/5
(58) Field of Classification Search .............. 707/1–7, 707/10, 102, 200, 205, 100
See application file for complete search history.

(56) References Cited

U.S. PATENT DOCUMENTS

| | | | | |
|---|---|---|---|---|
| 5,983,216 A * | 11/1999 | Kirsch et al. | .................... | 707/2 |
| 6,160,549 A | 12/2000 | Touma et al. | ................ | 345/333 |
| 6,189,002 B1 | 2/2001 | Roitblat | ........................ | 707/1 |
| 6,272,478 B1 | 8/2001 | Obata | .......................... | 706/12 |
| 6,321,205 B1 | 11/2001 | Eder | .............................. | 705/7 |
| 6,446,061 B1 * | 9/2002 | Doerre et al. | .................. | 707/3 |
| 6,546,388 B1 * | 4/2003 | Edlund et al. | .................. | 707/5 |
| 6,763,354 B2 * | 7/2004 | Hosken | ......................... | 707/6 |
| 6,768,994 B1 * | 7/2004 | Howard et al. | ............... | 707/10 |
| 6,836,773 B2 * | 12/2004 | Tamayo et al. | ................. | 707/6 |
| 2007/0022072 A1 * | 1/2007 | Kao et al. | ..................... | 706/45 |

* cited by examiner

*Primary Examiner*—Mohammad Ali
*Assistant Examiner*—Marc R Filipczyk
(74) *Attorney, Agent, or Firm*—Schwegman, Lundberg & Woessner, P.A.

(57) ABSTRACT

Methods and systems for locating related reports are provided. A report application identifies a first report to process along with preference selections associated with finding related reports to the first report being processed. A data preparation application performs an initial filter against a report data store using the first report and the preference selections. The data preparation application passes candidate reports and the first report to a data mining application. The data mining application uses the first report, the candidate reports, and a report usage data store to find relationships and associations with additional reports. In one embodiment, the additional reports are ranked and organized before being presented to the report application as related reports to the first report.

13 Claims, 3 Drawing Sheets

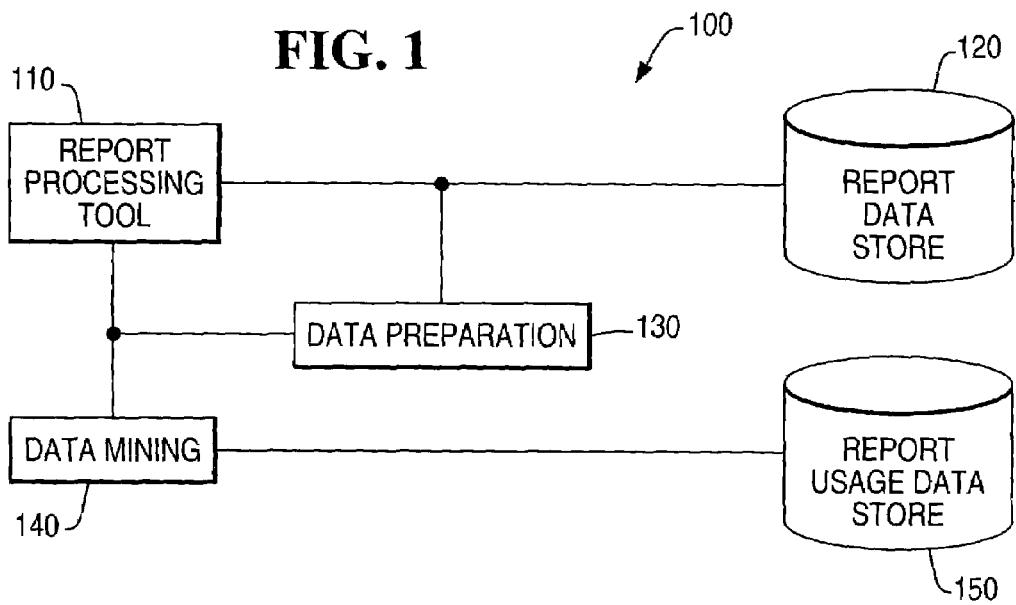
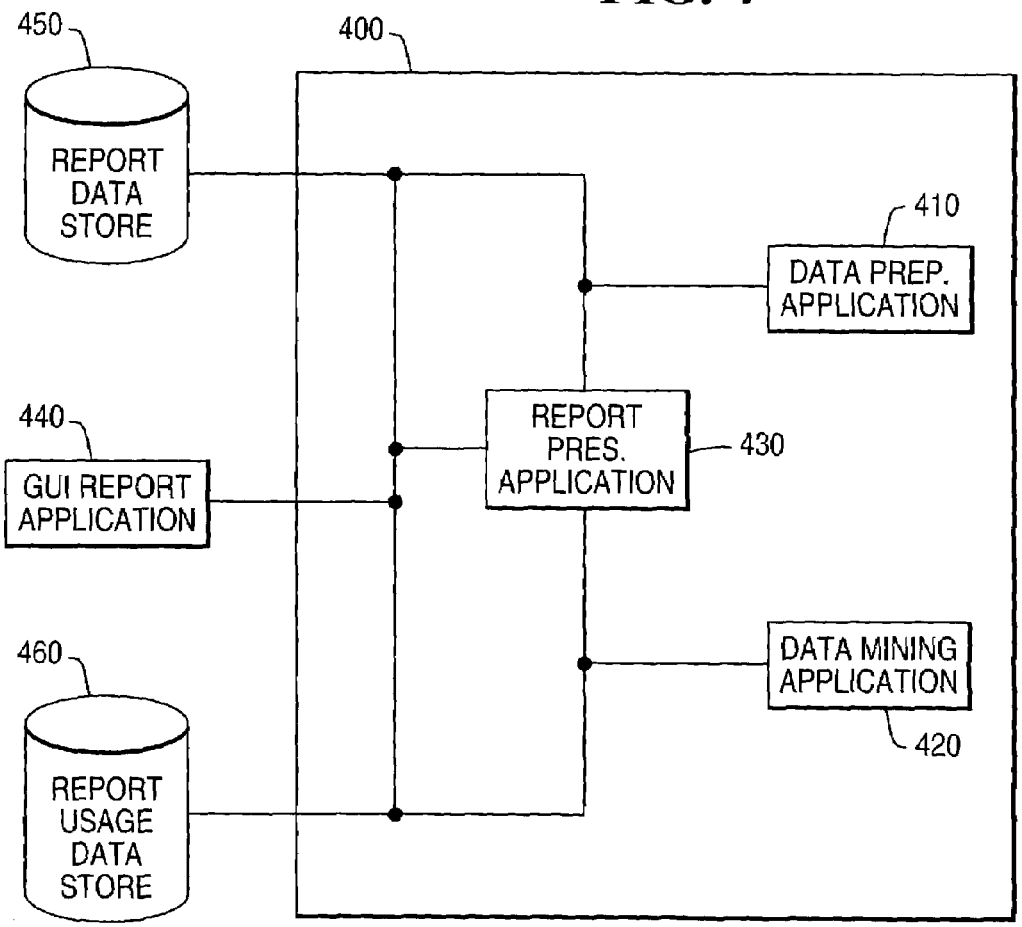

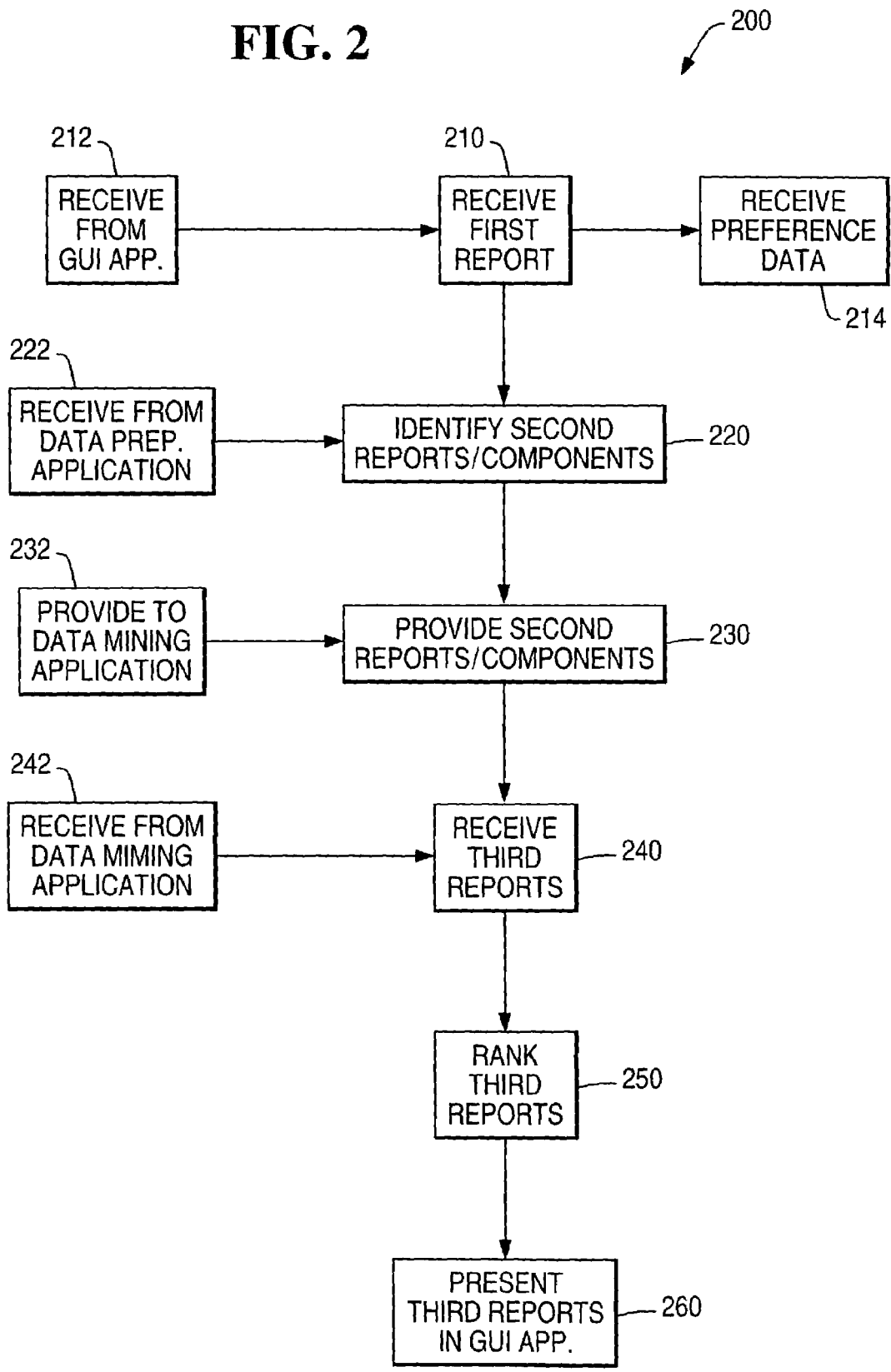

METHODS AND SYSTEMS FOR LOCATING RELATED REPORTS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, NCR Corp. All Rights Reserved.

FIELD OF THE INVENTION

The present invention relates to report locating systems, and in particular to methods and systems that compare, identify, and define related reports associated with an initially processed report.

BACKGROUND OF THE INVENTION

Information is critical to businesses in today's highly competitive environment and interconnected society. As a result, businesses use a variety of information tools to assist them in making more intelligent business decisions. Some of these tools include report tools used to analyze business performance and, in some cases, forecast business performance. Other tools are data mining tools used to identify previously unrecognized relationships and associations in a business's data store. In some cases, the analysis of the data produced by the tools can be used to improve Customer Relationship Management (CRM) applications and Business Intelligence (BI) solutions within the business in order to increase performance.

The foundation for better analysis of business performance is the collection of data related to transactions of the business. This data can be captured using from various online transaction processing (OLTP) applications that record transactions and/or behaviors of customers when the customers interact with the organizations in some way. Typically, the collected data is organized and stored by the business in a variety of data stores (e.g., data bases, data warehouses, and the like). Also, the data stores can include information gathered from various data mining, Word Wide Web (WWW) mining, and Decision Support System (DSS) applications.

Some businesses may deploy a variety of BI reports that allow the organization to use other reporting tools, such as Online Analytical Processing (OLAP) tools (e.g., MicroStrategy, Cognos, and others) to create dimensions, metrics, filters, and templates associated with analyzing and viewing the business's data. The created dimensions, metrics, filters, and templates combine to form the BI reports that process against the business's data in order to display results in tables and/or graphs. Further, some report tools permit visualization where data presented within the tools can be interactively modified or expanded to provide customized analysis.

Moreover, businesses develop or purchase data mining applications to assist the business in identifying associations and relationships within the business's data store. For example, a data mining application might identify a relationship between a geographic location and a product of service of the business, such that there is a higher probability of making a sale when the sale is made within the identified geographic location.

Conventionally, a business hires a business analyst who understands the data and can effectively use the report tools, visualization tools, and the data mining tools to interpret the data. The business analyst uses the various tools to answer business question or to develop plans to meet business objectives. In doing this, the business analyst will collect data, build data store tables, build reports, build data models, create visualizations, access data mining tools, and the like.

Yet, much of the analysis performed by a single business analyst within the business is not shared or leveraged with other business analysts within the business. Accordingly, much of a business analyst's time is expended sifting through a variety of previously developed reports in search of existing reports that will provide value to the business analyst's current task/problem. Often times to avoid the delay, a business analyst will forego the search for existing reports and define a new report that meets the needs of the business analyst. However, technical staff within the business often creates/modifies reports, so any new reports or modifications to existing reports must be passed to the technical staff, which usually requires a technical review and update schedule. This can result in a substantial time delay before the business analyst acquires the report that he/she desires.

Furthermore, since each business analyst within the business has his/her own individual technique duplicative reports are proliferated within the business. Additionally, many relevant and useful existing reports are undetected by the business analyst. Also, since the business analyst is manually trying to identify relevant existing reports, the search process is not consistent and/or optimal because it relies on the skill and technique of the individual business analyst.

Therefore, there exists a need for providing techniques, methods, and tools that better identify and to define related or new reports within a business's data store. With such techniques, methods, and tools, businesses can more timely and efficiently answer business questions and develop plans to meet business objectives. Moreover, with such techniques, methods, and tools, businesses can improve the quality of information that is culled from the business's data store to facilitate better analysis of the data.

SUMMARY OF THE INVENTION

In various embodiments of the present invention methods and systems are described to located relevant reports. A first report is identified and preference selections are made that identify significant features/attributes of the first report desired by a business analyst. The first report and preference selections are passed to a data preparation application, where a first set of related reports are culled from a report data store. Next, the first report and the first set of related reports are passed to a data mining application. The data mining application uses the first report, the first set of related reports, and a report usage data store to identify associations and relationships with a second set of related reports. The second set of related reports are then organized and presented to the business analyst as related reports associated with the first report. In some embodiments, the second set of related reports include newly specified or defined reports from components of existing reports.

More specifically, and in one embodiment of the present invention, a method to acquire related reports is presented. A first report is received and one or more second reports and components of the one or more second reports that are associated with the first report are identified using the first report. The one or more second reports and the components are provided to a data mining application. Moreover, one or more third reports are received from the data mining application, where the one or more third reports are related to the first report.

Another embodiment of the present invention, a report locator system is provided. The report locator system includes a data preparation application, a data mining application, and a report presenting application. The data mining application locates one or more candidate reports related to the first report. The report presenting application presents the one or more relevant reports. Furthermore, the one or more candidate reports are received by the data mining application from data preparation application. The data mining application uses a report usage data store to locate the one or more relevant reports, which are presented by the report locator application.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

BRIEF DESCRIPTION OF THE DRAWINGS

FIG. 1 is a diagram representing a report locator system, according to the teachings of the present invention;

FIG. 2 is a flow diagram representing a method to acquire related reports, according to the teachings of the present invention;

FIG. 4 is a diagram representing another report locator system, according to the teachings of the present invention.

DETAILED DESCRIPTION OF THE INVENTION

Figure 3:
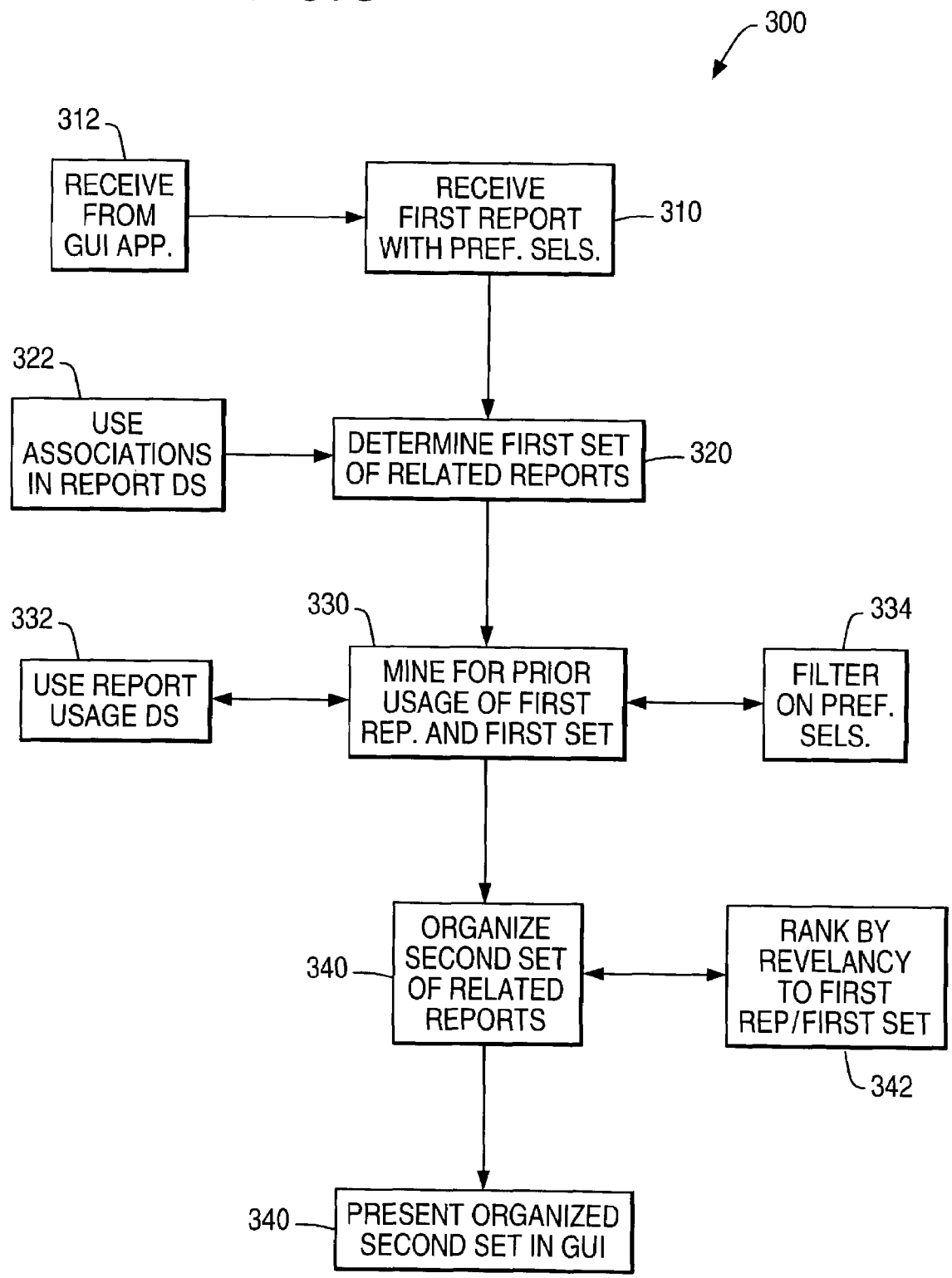
FIG. 3 is a flow diagram representing another method to acquire related reports, according to the teachings of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Moreover, as used herein a "report" can include traditional static reports, OLAP reports, interactive visualizations, data models, sub-reports (e.g., components of a report), newly defined/specified reports, and the like. In various embodiments of the present invention, the tools of the present disclosure are implemented as a GUI interfaces using WWW pages within a WWW browser. Moreover, the data store is a Teradata warehouse, distributed by NCR Corporation of Dayton, Ohio. Furthermore, various CRM or BI applications that can be developed with the present invention are embodied within a Teradata Customer Analysis product and/or a Teradata Retail Decisions Product, both distributed by NCR Corporation of Dayton, Ohio. Of course it is readily apparent to one of ordinary skill in the art that any interface tool, data store, CRM application, or BI application can be used with the tenets of the present invention, and all such implementation decisions are intended to fall within the scope of the present disclosure.

FIG. 1 illustrates a diagram representing one report locator system 100, according to the teachings of the present invention. The locator system 100 can be implemented to interface with a variety of existing reporting tools, such as OLAP reporting tools (e.g., Microstrategy, Cognos, Brio, and others). Moreover, the locator system 100 can be implemented to interface with a variety of data mining tools (e.g., Virtual Gold, and others). Of course, as one of ordinary skill in the art will appreciate upon reading the present disclosure, any existing or custom developed reporting tool and/or data-mining tool can be used to achieve the teachings of the present invention.

The locator system 100 includes a report processing tool 110 (e.g., any existing or custom developed reporting tool modified to achieve the teachings of the present invention), a report data store 120, a data preparation application 130, a data mining application 140 (e.g., any existing or custom developed data mining tool modified to achieve the teachings of the present invention), and a report usage data store 150.

The report-processing tool 110 includes a processing link to access a preference input display. In some embodiments, the preference input display is implemented as a Graphical User Interface (GUI) application. The preference input display accepts user-defined parameters that are deemed significant by a user. For example, some parameters can include ranges for defined attributes of a user-selected report, such as largest change in inventory over a defined period of time, a defined period of time, values inside or outside a normal range, mean versus averages, gains versus loses, and others. The parameters can also include logical expressions to perform user-defined arithmetic. The attributes can represent metrics, dimensions, or filters associated with the user-selected report. In some embodiments, the attributes are identified as column or row names used in a data store being accessed by the user-selected report.

Moreover, the parameters can be used to identify a similarity-index value, where the value is used to return to the user (e.g., via the report processing tool) related reports that conform to the similarity-index value. In some embodiments, the index value is an integer value between 0-100, where a value of 0 returns all reports in the report data store 120, and a value of 100 returns only the user-selected report. In this way, the similarity-index value is used to determine the recall and precision of any reports returned as related reports to the user-selected report. As the similarity-index value decreases recall increases while precision decreases, and as the similarity-index value increases precision increases while recall decreases.

The preference input display can also be configured to identify the identity of the user accessing the preference input display. In this way, a user's job function, title, and location can be automatically determined by the preference input display, or an underlying application associated with the preference input display. Similarly, the preference input display can identify the user-selected report. The user-selected report is the most relevant report initially identified by the user to solve the user's business question or assist the user in planning to meet a business objective.

The data preparation application 130 receives the information identified above from the preference input display, and accesses the report data store 120 to identify existing reports that conform to the user-defined parameters or to information automatically acquired by the preference input display. For example, if the user's job title is product sales analyst, then the data preparation application 130 can acquire existing reports from the report data store 120 used by other users with the job title product sales. Furthermore, automatically acquired information can be used to acquire reports from the report data store 120 associated with common report computations (e.g., the field names for rows or columns in the report data store are similar), common business objections (e.g., the user is trying to plan to meet a similar business objective of a previous user), and common business question (e.g., the user is trying to answer a similar business question of a previous user).

Moreover, the manually provided user-defined parameters can be used to search the report data store 120 for reports that have computations that conform to the user-defined parameters. This can be achieved by inspecting the expressions of existing reports in the report data store 120 against the user-defined parameters, or by initially acquiring a set of potential reports from the report data store 120 and processing them to inspect the results and then comparing the results against the user-selected report's results. The expressions, row names, and column names of an existing report are accessed by inspecting the existing report's metadata.

Additionally, the data preparation application 130 can analyze the user-selected report and existing reports included within the report data store 120 to define new reports. This can be done by selecting components of existing reports that conform to the user-selected report and/or to the user-defined parameters. Thus, a user can manually identify a single report or multiple reports, and an analysis of the metadata (e.g., components or metrics) of the manually identified report(s) can be used to query the report data store 120 to suggest related reports. Furthermore, the metadata can be used determine used to determine what set of metadata appears in one or more reports in the report data store 120, where each determined set becomes a pseudo base report for use by the user to discover related reports. In this way, standard SQL queries can be constructed to query the metadata contained in the report data store 120 by using the metadata of the manually identified report(s) that is provided by the user.

As is now apparent to one of ordinary skill in the art, the preference input display and any associated applications can be used by the report processing tool 110 to communicate with the data preparation application 130. The data preparation application 130 then identifies associations between the user-selected report and the user-defined parameters to existing reports or components of existing reports included within the report data store 120. Also, a business's Key Performance Indicators (KPIs), business questions, and business objectives can be better leveraged and associated with existing reports and then used by the data preparation application 130 to retrieve related reports associated with the user-selected report.

The identified existing reports or components of existing reports can then be passed by the data preparation application 130 to the data mining application 140. The data mining application uses existing techniques such as cluster analysis, segmentation analysis, market basket analysis, factor analysis, and the like to identify associations and relationships among a set of candidate related reports supplied by the data preparation application 130, the user-selected report, and existing reports. The data mining application 130 can be any existing data mining application 130 or any custom developed data mining application 130. Furthermore, the analysis uses a report usage data store 150. The report usage data store 150 includes historical data related to the processing of existing reports.

The data mining application 130 can also use the user-defined parameters, such as the similarity-index value. Any associative algorithm can be used by the data mining application 130 to decipher patterns in the reports (e.g., "A & B<C," and the like). Alternatively, the data mining algorithm can use cluster analysis to group reports by type (e.g., job function of user, title of user, location of user, and the like). Data mining applications 130 are readily available to one of ordinary skill in the art, and any such implementation data mining applications 130 used to achieve to acquire related reports is intended to fall within the broad scope of the present invention.

Additionally, the data mining application 130 can also be tailored to new reports from the report data store 120, by identifying component expressions in existing reports and selectively building a new report from the component expressions. For example, if the user identifies, through the user-defined parameters, KPIs as Gross Sale Units Year-to-date, Gross Margin Year-to-date, Gross Sales Dollars Year-to-date, then the data mining application 130 can define or specify a number of additional reports based on various combinations. Furthermore, the data mining application 130 can define filters, dimensions, and templates, which are the base objects necessary for generating a report. The defined reports can be refined based on the same or similar reports in the metadata of the report data store 120. Additionally, once existing reports are identified, then the user-defined parameters can be used to acquire components of existing reports, which are then used to derive sub-reports.

The data mining application 130 uses the acquired related reports, which can included newly defined/specified reports or sub-reports, and applies any similarity-index value provided in the user-defined parameters to rank an answer set of reports that represent the related reports. The ranked answer set is then provided to the user via the report-processing tool 110, where the user can selectively pick related reports to satisfy the user's KPIs, business questions, and/or business objectives.

As one of ordinary skill in the art now appreciates, the report locator system 100 of FIG. 1 permits a business analyst to more efficiently use a business's report data store 120. The efficient use of the report data store 120 provides the business analyst with a systematic and automatic technique for reliably and efficiently acquiring related reports, related data models, and related visualizations from the business's report data store 120. This will improve the analytic evaluation of the business analyst and leverage a business's existing assets and knowledge store.

FIG. 2 illustrates a flow diagram representing one method 200 to acquire related reports, according to the teachings of the present invention. Initially, in 210, a first report is received. In one embodiment, and in 212, the first report is received from a user via a GUI application, such as a reporting tool application. Moreover, in some embodiments, the first report is received with preference data, as depicted in 214. The preference data can include a selection of user-defined ranges or expressions associated with report attributes (e.g., data store column names, data store row names, filters, metrics, dimensions, and the like). Additionally, in some embodiments, some of the preference data is automatically detected by an interaction with a user (e.g., user's job function. user's business question, user's location, user's KPI, user's title, user's business objective, and the like).

In 220, the first report, and the preference data, as the case may be, is used to identify one or more second reports and components of the second reports that are associated with the first report. Components can consist of similar expressions, column names, row names, and the like, which are included in the first report or conform to the preference data. In one embodiment, the second reports are received by a data preparation application, as depicted in 222.

The data preparation application can interface with the GUI application to receive the first report and the preference data. Further, the data preparation application establishes relationships and identifies the second reports by inspecting metadata and links included within a report data store that house existing reports. Some relationships can include existing reports with users having the common job title, job function, and location of the user accessing method 200. Other relationships can include existing reports having a common business question, business objective, or KPI as the first report. Still further relationships, can include existing reports with the common column names, row names, or computations that are used by the first report.

In 230, the second reports and the components are provided to a data mining application (e.g., 232). The data mining application can use any algorithm conventionally available, or can be custom developed to meet the needs of a business. The data mining application, in one embodiment, accesses report usage data located in a report usage data store. The report usage data identifies historical statistics associated with the processing of existing reports. In one embodiment, the existing reports reside in a report data store. The data mining application then performs algorithms against the first report, the second reports, any provided preference data, and the report usage data to identify relationships between the first report and any existing reports in the business's report data store. In some embodiments the relationship can be as simple as identifying existing reports that were subsequently processed when other users previously processed the first report.

The result of processing these algorithms produces one or more third reports, which are related to the first report. The third reports are received in 240 from the data mining application, as depicted in 242. In some instances, the third reports include sub-reports of existing reports. Furthermore, in some cases, the third reports include newly defined/specified reports specified by the data mining application or one or more report generating applications interfaced to the data mining application. Moreover, the third reports can represent interactive visualization reports, existing or pre-defined reports, and data modeling reports.

Optionally, in 250, the third reports can be ranked by the data mining application or any other application interfaced with the data mining application. Ranking of the third reports can be based on parameters included in the preference data, such as a similarity-index value, or based on the configuration of the data mining application.

In 260, the ranked, or unranked, as the case may be, third reports are presented to the GUI application. A user of the GUI application can then selectively identify a number of the third reports that will assist the user in analyzing the user's problem (e.g., business question, KPI, business objective, and the like).

One of ordinary skill in the art now appreciates, that method 200 permits the automatic association and identification of relevant related reports when a first report is identified. This standardizes the analytical process of attempting to leverage a business's report data store and increases efficiency of the user when analyzing data.

FIG. 3 illustrates a flow diagram representing another method 300 to acquire related reports, according to the teachings of the present invention. In 310, a first report and preference selections are received. The first report represents an initial report selected by a user, the first report is believed by the user to be relevant to a business question, KPI, or business objective of the user. In one embodiment, the first report and the preference selections are received from a GUI application, as depicted in 312. The GUI application can be any existing report tool, or modified version of existing report tools to provide an input screen for preference selections.

The preference selections identify ranges of values or expressions that the user identifies to further filter any identified relevant reports. The preference selections can represent row names, column names, metrics, filters, and/or dimensions associated with the first report. Moreover, in some embodiments the preference selections include a similarity-index value used to adjust the recall and precision associated with retrieving related reports. Additionally, a number of preference selections can be automatically provided without user intervention (e.g., user identity, user job function, user title, user-defined business question, user-defined KPI, user-defined business objective). In some cases, the first report selected by the user will already be associated (e.g., via the metadata of the first report) with a number of the preference selections (e.g., business questions, KPIs, and business objectives).

In 320, a first set of related reports to the first report are determined. The first set of related reports can be determined by using metadata associations of the first report and the manually provided preference selections to evaluate other candidate reports in a report data store, as depicted in 322. In some cases, the first set of related reports can be sub-reports of existing reports included within the report data store. In other cases, components of existing reports can be combined in unique combinations to form new reports that are also included in the first set of related reports. Furthermore, row names and column names of the first report can be compared against row and column names of the candidate reports to acquire similar associations and determine relatedness between a number of the candidate reports and the first report.

In some cases, the first report is processed within the GUI application and the results are filtered by the preference selections before filtering the first set of related reports from the report data store. In this way, the first set of related reports can be associated with an unprocessed first report and/or a processed first report.

In 330, the first set of related reports, the first report, and in some cases the preference selections can be used to mine a report usage data store, in 332, to acquire a second set of related reports. Additionally, in 334, some preference selections, such as any similarity-index value, can be used to further filter the second set of related reports to a smaller or in some cases a larger set of related reports. Data mining can be achieved using any existing or custom-developed algorithm to establish relationships and associations within the report usage data store with the first set of related reports, the first report, and in some cases the preference selections. Moreover, the mining algorithms alone or in combination with other algorithms can define or specify new reports or sub-reports from the report data store using metadata of existing reports included within the report data store.

In 340, and in some embodiments, the second set of related reports are organized. For example, the second set of related reports can be ordered from the most relevant report included within the second set of related reports to the least relevant report included within the second set of related reports, as depicted in 342. Additionally, the second set of related reports can include one or more reports of the originally provided first set of related reports. But, the second set of related reports need not include all of the originally reports provided with the first set of related reports. Further, in some embodiments, any provided similarity-index value can be used by the mining algorithm to reduce or increase the number of reports included in the second set of related reports, and also used to rank each report within the second set of related reports.

Accordingly, in 350, a number of the first set of related reports and a number of the second set of related reports are presented for consumption and possibly selection to a user. In one embodiment, the presented reports are presented within the GUI application (e.g., reporting tool) to which a user is interacting.

FIG. 4 illustrates a diagram representing another report locator system 400, according to the teachings of the present invention. The report locator system 400 includes a data preparation application 410, a data mining application 420, and a report presenting application 430. The report locator system 400 and its components (e.g., 410, 420, and 430) interface to a GUI report application 440 (e.g., reporting tool), a report data store 450 (e.g., existing reports and their metadata), and a report usage data store 460 (e.g., historically information and statistics associated with previously processed existing reports). In one embodiment, the GUI report application 440 can be used to configure the data preparation application 410, the data mining application 420, and the report presenting application 430.

The interfaces among the system 400, the external data stores (e.g., 460 and 450), and the external GUI report application 440 can be any software interface, such as an Application Programming Interface (API) library having a series of communication modules. Furthermore, the report locator system 100 need not reside on a single computing device and the components (e.g., 410, 420, and 430) can be distributed across one or more networks. Likewise, the external components (e.g., 440, 450, and 460) can be distributed across one or more networks.

The data preparation application 410 receives, in one embodiment, preference selections and a first report from the GUI report application 440. The preference selections can be directly supplied to the GUI report application 440 via one or more input screens provided to a user. Additionally, the preference selections can be automatically determined based on metadata associations of the first report (e.g., linked business questions, linked KPIs, linked business objectives, and the like). The preference selections can also be automatically determined based on associations with the user (e.g., user identity, user job function, user location, user title, and the like).

Further, the preference selections can represent limitations associated with column names, row names, filters, dimensions, or metrics of the first report. The limitations can be ranges, expressions, or constant values. Additionally, the preference selections can include a similarity-index value used to increase or decrease the recall (alternatively decrease or increase the precision) of reports that are identified as related reports.

The data preparation application 410 uses the first report and the preference selections, as the case may be, to identify one or more candidate reports in the report data store 450. This can be achieved by analyzing the metadata of existing reports in the report data store 450. In some cases, the candidate reports can be sub-reports of existing reports, or newly defined/specified reports from components of one or more of the existing reports.

The data preparation application 410 then passes the first report, the candidate reports, and if applicable the preference selections to the data mining application 420. The data mining application identifies patterns or clusters in the report usage data store 460 that indicate relationships and associations within the metadata of previously processed existing reports. The data mining application 420 can also access the report data store 450 to acquire the necessary metadata for analysis. Moreover, the data mining application 420 can identify sub-reports or specify new reports from the existing report's metadata.

Once the data mining application 420 has identified a set of relevant reports (e.g., existing, sub-reports, or newly defined/specified reports), the data mining application can be configured to rank and order the set of relevant reports.

The set of relevant reports are then provided to the report presenting application 430 that interfaces with the GUI report application 440 to present the set of relevant reports to the user. Furthermore, in some embodiments, the report presenting application 430 can be configured to detect and remove any duplicate reports included within the set of relevant reports before presenting them in the GUI report application 440 for consumption by the user.

One of ordinary skill in the art now understands how the teachings of the present invention permit a business to implement a reliable and consistent technique for analyzing the business's data to answer business questions, address KPIs of the business, and plan to meet business objectives. Moreover, the knowledge associated with business questions, KPIs, and business objectives are more fully leveraged within the business.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A machine-implemented method to acquire related reports, comprising:
   receiving a user-selected first report and a user-defined numerical index value provided by the user in user-defined parameters;
   identifying one or more second reports and components of the one or more second reports that are associated with the first report, wherein the components are sub-reports;
   providing the one or more second reports and the components to a data mining application; and
   receiving one or more third reports from the data mining application, wherein the one or more third reports are related to the first report and precision and recall of the one or more third reports conform to the numerical index value, wherein the numerical index value instructs the data mining application on the precision of relatedness of the received one or more third reports to the first report and a number of one or more third reports recalled in relation to the first report, and wherein the third reports are derived from the one or more second reports and the components, and each of the reports and each of the components is acquired from a business report data store, and wherein the numeric index value includes a value from 0 to 100 and is assigned by a user, and as the numeric index value increases the precision increases and the recall decreases and as the numeric index value decreases the precision decreases and the recall increases.

2. The method of claim 1 further comprising, receiving preference data, the preference data includes at least one of a selection of ranges for report attributes and an expression associated with the report attributes, and wherein the preference data is used to identify one or more of the second reports and the components.

3. The method of claim 1, wherein in identifying the one or more second reports and the components, the one or more second reports and the components are associated with the first report based on at least one of a common business job function, a common report computation, a common business objective, and a common business question.

4. The method of claim 1, wherein in providing the one or more second reports and the components, the data mining application accesses report usage data associated with the first report when identifying the one or more third reports.

5. The method of claim 4, wherein in providing the one or more second reports and the components, the data mining application identifies a number of the one or more third reports by identifying from the report usage data the number of the one or more third reports that were processed when the first report was previously processed.

6. The method of claim 1, wherein in receiving the one or more third reports from the data mining application, the one or more third reports are ranked based on their relevancy to the first report.

7. The method of claim 1, wherein in receiving the one or more third reports from the data mining set of executable instructions, a number of the third reports represent at least one of interactive visualization reports, data modeling reports, pre-defined reports, sub-reports, and newly specified reports.

8. A machine-implemented method to acquire related reports, comprising:
   receiving a user-selected first report and user-defined preference selections including a numerical index value provided by a user in user-defined parameters;
   determining a first set of related reports based on associations of the first report and the preference selections;
   mining a report usage data store for prior usage associated with the first report and the first set of related reports to acquire a second set of related reports; and
   presenting a number of related reports included within the first set of related reports and the second set of related reports, wherein the first report, the first and second sets of related reports, and the related reports are business reports, and wherein the related reports are derived from the first and second sets of related reports, and wherein the numerical index value corresponds to precision of relatedness of the related reports to the first report and a number of related reports recalled in relation to the first report, and wherein the numeric index value includes a value from 0 to 100 and is assigned by a user, and as the numeric index value increases the precision increases and the recall decreases and as the numeric index value decreases the precision decreases and the recall increases.

9. The method of claim 8 wherein in determining, the associations of the first report are determined by comparing rows and columns associated with the first report against candidate reports.

10. The method of claim 8 further comprising, processing the first report and using the preference selections to filter results before determining the first set of related reports.

11. The method of claim 8 wherein in mining, the first set of related reports is used to establish associations and relationships from the report usage data store.

12. The method of claim 8 wherein in presenting the number of reports, the number of reports are organized according to relevancy before presenting the number of reports.

13. The method of claim 8, further comprising:
   specifying one or more new reports related to the first report; and
   presenting the one or more new reports.

* * * * *